(12) United States Patent
Northfield

(10) Patent No.: US 11,939,022 B2
(45) Date of Patent: Mar. 26, 2024

(54) FOLDING BICYCLE

(71) Applicant: Quinten John Northfield, West Wickham (GB)

(72) Inventor: Quinten John Northfield, West Wickham (GB)

( * ) Notice: Subject to any disclaimer, the term of this patent is extended or adjusted under 35 U.S.C. 154(b) by 346 days.

(21) Appl. No.: 17/284,136

(22) PCT Filed: Oct. 10, 2019

(86) PCT No.: PCT/EP2019/077541
§ 371 (c)(1),
(2) Date: Apr. 9, 2021

(87) PCT Pub. No.: WO2020/074673
PCT Pub. Date: Apr. 16, 2020

(65) Prior Publication Data
US 2021/0331763 A1    Oct. 28, 2021

(30) Foreign Application Priority Data
Oct. 12, 2018 (GB) ...................................... 1816673

(51) Int. Cl.
*B62K 15/00* (2006.01)
*B62K 19/28* (2006.01)
(Continued)

(52) U.S. Cl.
CPC ............ *B62K 15/008* (2013.01); *B62K 19/28* (2013.01); *B62K 19/34* (2013.01); *B62K 21/18* (2013.01);
(Continued)

(58) Field of Classification Search
CPC .... B62K 15/008; B62K 15/006; B62K 19/34; B62K 15/00; B62M 9/16
See application file for complete search history.

(56) References Cited

U.S. PATENT DOCUMENTS

| | | | |
|---|---|---|---|
| 421,557 | A | 2/1890 | Crawford |
| 552,376 | A | 12/1895 | Jordan |

(Continued)

FOREIGN PATENT DOCUMENTS

| | | |
|---|---|---|
| CN | 201842211 | 5/2011 |
| CN | 204432878 | 7/2015 |

(Continued)

OTHER PUBLICATIONS

Search Reports of GB Application 1816673.6 dated Mar. 13, 2019 and Apr. 19, 2019.

(Continued)

*Primary Examiner* — Kevin Hurley
*Assistant Examiner* — Michael R Stabley
(74) *Attorney, Agent, or Firm* — Dorsey & Whitney LLP

(57) ABSTRACT

An aspect of the invention provides a folding bicycle (10) comprising a first frame section (12*a*); a second frame section (12*b*) movably mounted to the first frame section so that the first and second frame sections may be moved relative to each other from an unfolded position to a folded position; a front wheel (40) mounted to the first frame section; a rear wheel (42) mounted to the second frame section; a chainset (48) mounted to the first frame section comprising a pair of crank arms (48*a*) fixed to a bottom bracket axle (74) and defining a crank shaft axis orthogonal to the first and second frame sections; wherein, the bottom bracket axle comprises first and second axle members (74*a*) extending orthogonally to the crank arm axis and a bridge portion (74*b*) connecting the first and second axle members, the bottom bracket axle defining a void between the first and second axle members, and wherein, when in a folded position the front and rear wheels are positioned at least partially within the void defined between the first and second axle members.

10 Claims, 16 Drawing Sheets

(51) Int. Cl.
  *B62K 19/34* (2006.01)
  *B62K 21/18* (2006.01)
  *B62M 6/70* (2010.01)
  *B62M 9/16* (2006.01)
(52) U.S. Cl.
  CPC ............... *B62M 6/70* (2013.01); *B62M 9/16* (2013.01); *B62K 2015/003* (2013.01)

(56) References Cited

U.S. PATENT DOCUMENTS

| | | | | |
|---|---|---|---|---|
| 4,022,485 | A * | 5/1977 | Cox | B62K 15/006 280/287 |
| 4,182,522 | A * | 1/1980 | Ritchie | B62K 15/008 280/278 |
| 4,552,468 | A | 11/1985 | Hopper, Jr. | |
| 5,421,786 | A * | 6/1995 | Ando | B62K 19/30 474/78 |
| 7,445,224 | B2 * | 11/2008 | Whyte | B62K 15/008 280/278 |
| 7,600,771 | B2 * | 10/2009 | Miller | B62M 1/28 474/69 |
| 8,123,243 | B2 * | 2/2012 | Ho | B62K 15/008 280/278 |
| 8,152,189 | B2 * | 4/2012 | Dodman | B62K 25/005 280/281.1 |
| 8,473,130 | B2 * | 6/2013 | Brady | B62M 6/90 280/270 |
| 2004/0084272 | A1 | 5/2004 | Yoshie et al. | |
| 2007/0013162 | A1 * | 1/2007 | Whyte | B62K 15/008 280/278 |
| 2011/0148069 | A1 * | 6/2011 | Ho | B62K 15/008 280/278 |
| 2012/0043148 | A1 | 2/2012 | Brady et al. | |
| 2014/0225346 | A1 * | 8/2014 | Bettin | B62K 19/32 280/236 |
| 2015/0353160 | A1 * | 12/2015 | Augustinoy | B62K 15/006 280/287 |

FOREIGN PATENT DOCUMENTS

| | | |
|---|---|---|
| CN | 105947056 | 9/2016 |
| CN | 106515961 | 3/2017 |
| CN | 106926955 | 7/2017 |
| DE | 4400500 | 7/1995 |
| DE | 4425664 | 1/1996 |
| DE | 102014217278 | 3/2016 |
| EP | 1212235 | 6/2002 |
| GB | 2213439 | 8/1989 |
| GB | 2249529 | 5/1992 |
| GB | 2401589 | 11/2004 |
| JP | H07 196062 | 8/1995 |
| JP | 2005161930 | 6/2005 |
| JP | 2010228774 | 10/2010 |
| JP | 2014054924 | 3/2014 |
| TW | M396254 | 1/2011 |
| TW | 201414644 | 4/2014 |
| WO | WO 2007057198 | 5/2007 |
| WO | WO 2011102590 | 8/2011 |
| WO | WO 2018024551 | 2/2018 |

OTHER PUBLICATIONS

International Search report and Written Opinion of PCT/EP2019/077541 dated Feb. 12, 2020.

* cited by examiner

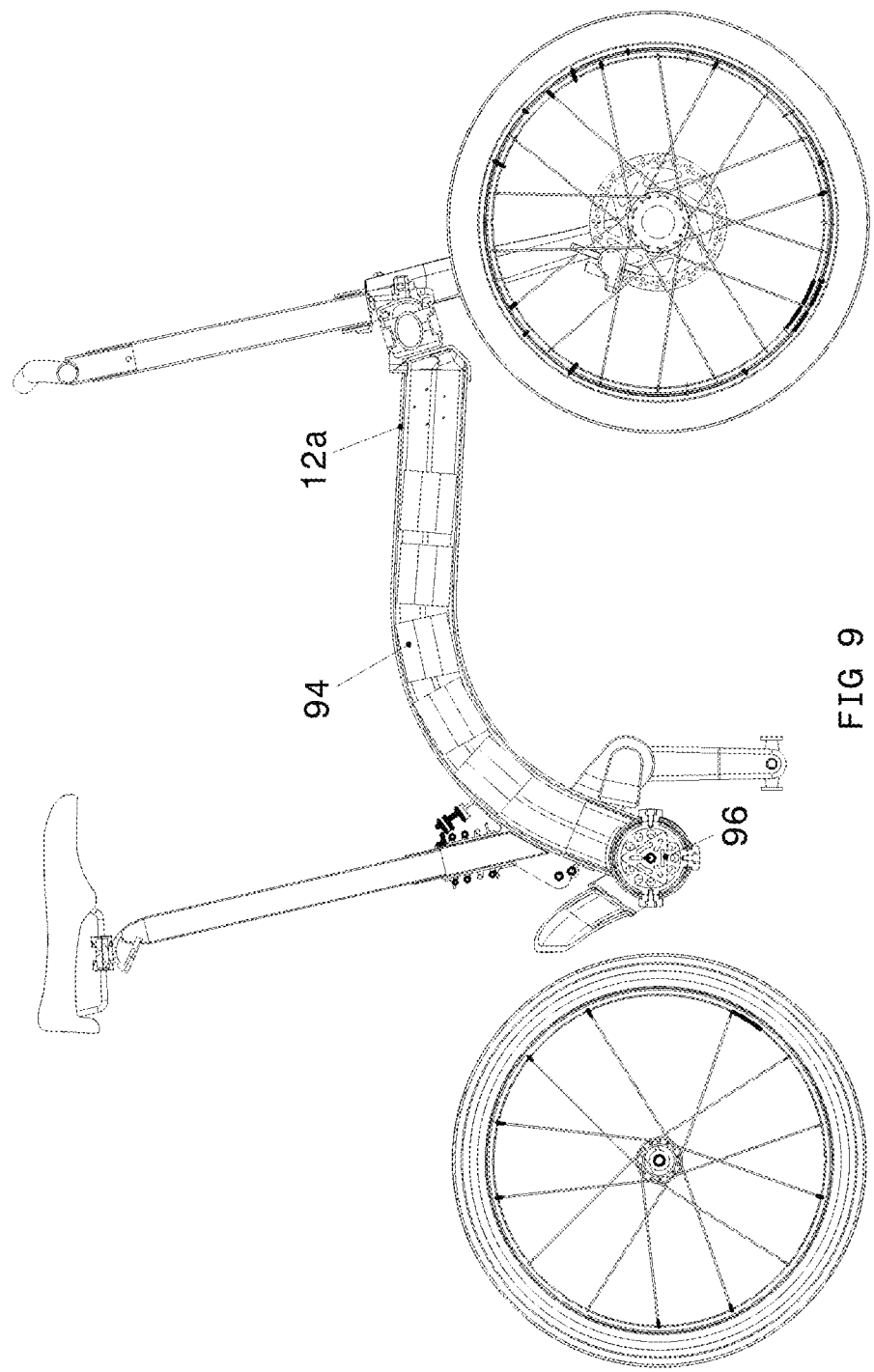

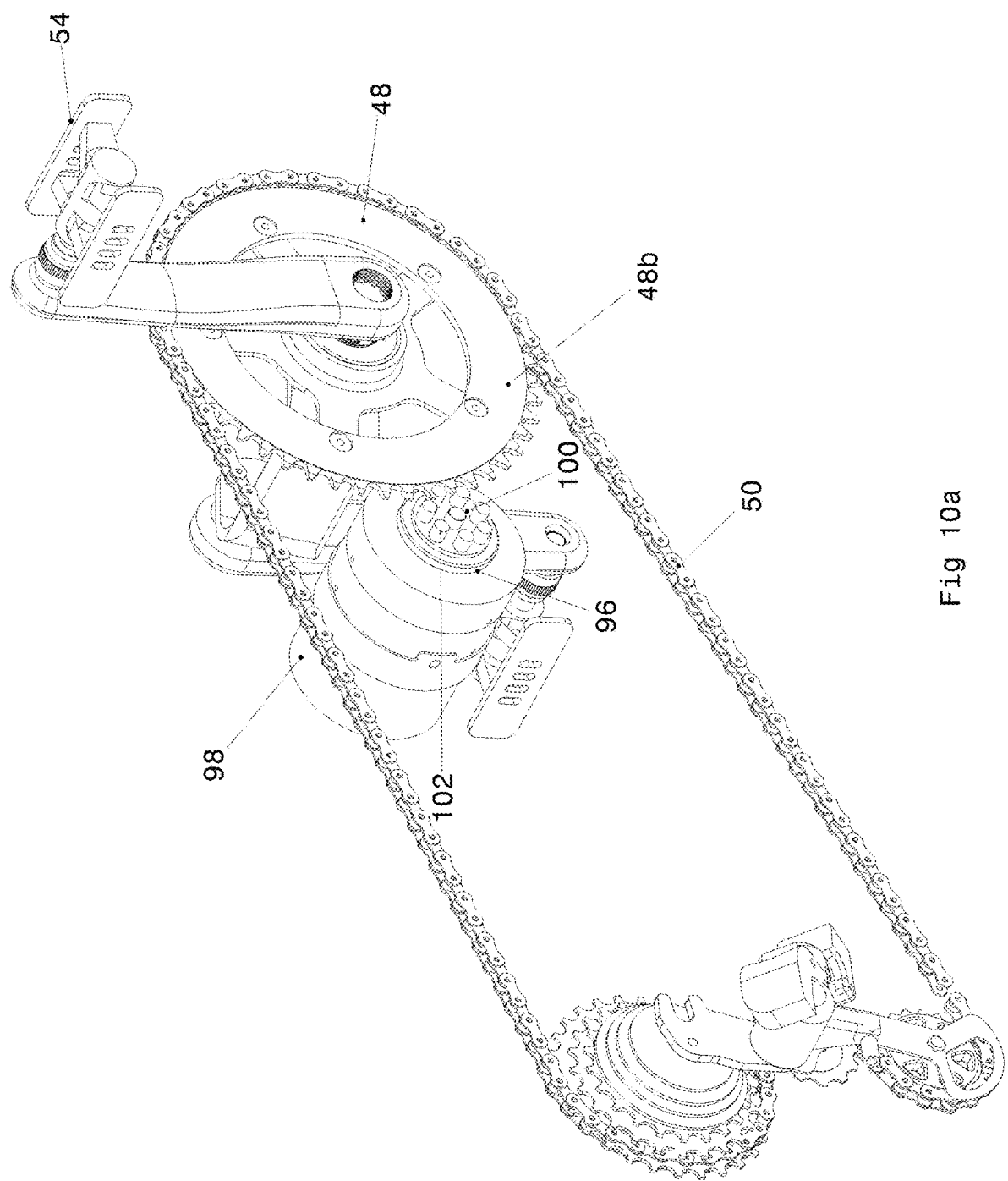

FOLDING BICYCLE

CROSS-REFERENCE TO RELATED APPLICATIONS

This application is a national stage application under 35 U.S.C. § 371 of International Application PCT/EP2019/077541, filed Oct. 10, 2019, which claims priority of GB Patent Application 1816673.6, filed Oct. 12, 2018. The disclosure of which are hereby incorporated by reference herein in their entireties.

FIELD

The present invention relates to a folding bicycle.

BACKGROUND

Cycling is a popular mode of commuting due to being inexpensive (other than the acquisition cost of the bicycle, clothing and safety equipment), environmentally friendly and the obvious health benefits of regular cardiovascular exercise. The cycling infrastructure in many cities is undergoing substantial improvement and, combined with governmental and private promotion of cycling, is further fueling a swell in numbers of commuters using cycling as their primary form of transport.

Many commuters live outside of the city boundaries within which they work. In order for such commuters to take advantage of cycling to work, they often need to transport their bicycle by car and/or train. Transporting a conventional bicycle is not convenient due to the inherently large size of such bicycles and the limited number of full sized bicycles that can be transported on a train. While there is no restriction to the number of folding bicycles that can be taken on the London Tube network irrespective of the time of day, the maximum wheel diameter of such a bicycle is twenty inches.

Furthermore, a full sized adult bicycle would not fit in many small cars without first needing to remove one, or both, wheels from the bicycle and needing to lay the rear seats of the car flat. The inconvenience of having to remove a vehicle parcel shelf and store in a home or garage, disassemble part of the bicycle and clean oneself up after re-assembling the bicycle is effective to deter some individuals from using cycling as a form of commuting.

Once at a destination, a conventional bicycle would usually be left outside in a bike shelter or locked to railings. Bikes stored in such a manner are prone to theft or damage. Because of such risks, many users resort to using cheap and/or old bicycles for commuting that can be easily replaced at little cost should they be stolen or damaged. Such bicycles may not provide a particularly satisfactory ride experience and again this may be effective to deter some individuals from using cycling as a form of commuting.

Folding bicycles were developed that, in most cases, had a hinge formed roughly in the middle of bicycle frame, between the saddle and handlebars. The hinge allows the frame to be folded by rotating a front section of the frame relative to the rear section of the frame. Typically, when in a folded configuration, the two sections of the frame would lie alongside each other and the front and rear wheels would be side by side thus significantly reducing the footprint of the bicycle as compared to when in its unfolded configuration.

Over time, developments to folding bicycles have reduced the footprint of such bicycles when in the folded configuration but at the expense of rider comfort, frame stiffness and ease of use.

An object of the present invention is to provide a folding bicycle that has a small foot print, is easy to use and retains the ride experience of conventional bicycles. Conventional folding bicycles generally do not meet these needs.

Aspects of the invention relate to folding bicycles and associated components and features that enable at least some of the aforementioned needs to be addressed. Certain aspects of the invention are applicable to both self powered and electrically powered folding bicycles whereas other aspects of the invention are applicable to only self powered folding bicycles or electrically powered folding bicycles, not both.

SUMMARY

According to an aspect of the present invention, there is provided a folding bicycle comprising a first frame section; a second frame section movably mounted to the first frame section so that the first and second frame sections may be moved relative to each other from an unfolded position to a folded position; a front wheel mounted to the first frame section; a rear wheel mounted to the second frame section; a chain set mounted to the first frame section comprising a pair of crank arms fixed to a bottom bracket and defining a crank shaft axis orthogonal to the first and second frame sections; wherein, the bottom bracket comprises first and second axle members extending orthogonally to the crank arm axis and a bridge portion connecting the first and second axle members, the bottom bracket axle defining a void between the first and second axle members, and wherein, when in a folded position the front and rear wheels are positioned at least partially within the void defined between the first and second axle members.

To minimise the foot print of folding bicycles, small wheels having a diameter of around sixteen inches are generally selected. Use of small wheels has a negative effect on ride comfort. Consider the situation where the bicycle wheel encounters a rough area of tarmac or a pothole. A smaller wheel will transfer significant vibration and impact loading into the frame of the bicycle due to a relatively small surface area of the tyre being in contact with the road. In contrast, use of a larger wheel results in a larger surface area of the tyre being in contact with the road thus reducing vibration and impact loading imparted into the bicycle frame. This has the effect of the wheel being more capable of rolling over undulations in the road surface without loss of inertia as can be experienced by smaller wheels. The present invention allows for larger diameter wheels to be selected in comparison to conventional folding bicycles. The applicant has found that bicycle wheels having a diameter of slightly less than twenty inches can be incorporated into the invention to improve ride comfort while minimising the overall footprint of the folding bicycle. To achieve this, when the folding bicycle is in the folded position, the front and rear wheels are positioned at least partially within the void defined between the first and second axle members of the bottom bracket. Such a configuration permits the front and rear wheels of the bicycle to be positioned further forward relative to the crank arm axis as compared to conventional folding bicycles and permits use of conventional bicycle geometry so as to negate: i) any compromise in rider ergonomics and ii) any inefficiencies in rider centre of gravity. In essence, the bottom bracket has a 'bridge' configuration which allows a disconnect between the folded wheel position of the bicycle and ride crank position.

The bottom bracket of a conventional folding bicycle typically contains a spindle that the chain set attaches to, and bearings that allow the spindle and the crank arms to rotate.

The bottom bracket would usually sit inside a bottom bracket shell, which connects the seat tube, down tube and chain stays of a bicycle frame. While in modern bicycles, the spindle and bearings is not really a bracket, the term is used for all bicycle frames and is therefore also used here.

The nature of conventional bottom brackets is such that the bottom bracket shell holds the bottom bracket captive. The bottom bracket shell is effectively a tube running through the frame perpendicularly such that an axis defined by the bottom bracket shell intersects the longitudinal axis of the folding bicycle. The bottom bracket shell acts as a hard stop limiting the position of the front and rear wheels when the folding bicycle is in the folded position. This aspect of the invention therefore departs from conventional folding bicycles in that no bottom bracket shell is required to hold the bottom bracket captive. The unique design of the bottom bracket enables the crank arms to be mounted directly to a respective axle member.

In one embodiment a bracket extends from the first frame section and defines respective mounting locations for each of the pair of crank arms thus offsetting the crank shaft axis away from the first frame section.

The design of folding bicycles according to aspects and embodiments of the invention dictates that non-conventional mounting means are provided in order to mount the crank arms to respective mounting locations. As described above, each crank arm would usually be mounted to a respective end of the bottom bracket spindle that is held captive within a bottom bracket shell. That is not possible in connection with aspects and embodiments of the invention. A bracket is therefore provided that extends from the first frame section. The bracket includes a pair of mounting locations, one for each crank arm, in a conventional location so as not to impair ride comfort and efficiency.

In one embodiment the first and second frame sections are formed from a carbon fibre material and the bracket is an integral moulded feature of the first frame section and further comprises one or more stiffening ribs between the bracket and the first frame section.

Bicycles having carbon fibre frames are generally accepted as being stronger and stiffer than conventional steel or aluminium frames and having less mass for the same loading conditions, However, any defect or disruption of the carbon fibre material can cause weaknesses in the frame structure leading to a risk of catastrophic failure. It is therefore not desirable for there to be many components mounted to the frame structure through bolts or screws. Similarly, brackets that are wrapped around a frame section can be overtightened thus leading to damage to the frame. To overcome such problems, a thin walled bracket is provided that extends from the first frame section in a generally downwards direction. The bracket may be formed from the same material as the first frame section and is directly moulded into the first frame section. To provide added strength and resistance to forces encountered from input force provided by a user, several stiffening ribs are provided between the bracket and the first frame section. The stiffening ribs are integrally moulded between the bracket and the first frame section. In other embodiments, the bracket can be formed from a metallic material and secondarily bonded to the first frame section.

According to another aspect of the invention, there is provided a folding bicycle comprising: a first frame section; a second frame section movably mounted to the first frame section so that the first and second frame sections may be moved relative to each other from an unfolded position to a folded position; a front wheel mounted to the first frame section; a rear wheel mounted to the second frame section; a chain set mounted to the first frame section and comprising one or more chain rings; a rear hub mounted to the second frame portion; a chain extending around and between the one or more chain rings and the rear hub; and a chain retainer fixedly mounted to the first frame portion and defining a gap between the chain set and the chain retainer to maintain engagement between the chain and the chain set when the folding bicycle is in the folding configuration.

Folding bicycles typically comprise at least two frame sections that are rotatable to move the front and rear wheels closer together. The position of the rear wheel is thus changed relative to the chain set when a conventional folding bicycle is moved from the unfolded to the folded position. The action of moving the position of the rear wheel into a new position closer to the chain set results in the chain becoming slack while the folding bicycle is in the folded position. A slack chain increases the risk of chain slippage either around the chain set or around the rear cassette that is positionally fixed relative to the axis of the rear wheel. To counter this, a chain retainer defines a fixed gap between the chain set and the chain retainer thus limiting how far the chain can move away from the chain set when the chain is slack. Such a configuration helps reduce the risk of chain slippage. Chain slippage is undesirable as the user is required to manually re-position the chain on to the chain rings and/or rear cassette. Bicycle chains are generally oily and manual manipulation would cause the user to get hard to remove grease, oil and dirt on his/her hands.

According to another aspect of the invention, there is provided folding bicycle comprising: a first frame section; a second frame section movably mounted to the first frame section so that the first and second frame sections may be moved relative to each other from an unfolded position to a folded position; a front wheel mounted to the first frame section; a rear wheel mounted to the second frame section; wherein each of the first frame section and second frame section are formed from carbon and have a constant cross section.

In conventional bicycle manufacture, the cross-section and wall thickness of the frame is variable and configured to provide greater strength and support at frame locations where greater stress is expected to be experienced during normal use. Use of a non-common cross-section frame increases the complexity of manufacture through different die and tool settings. Use of a common cross-section frame allows for use of a single set of tools and die settings thus reducing the manufacturing operations required to manufacture both the front and rear frame sections. This has the effect of reducing manufacturing time and cost and permitting use of automated manufacturing processing such as through a process known as automated fibre placement manufacturing. This process enables operation of constant feed speed braiding over a net shaped mandrel. The result of this process is a deposited laminate sock of consistent cross-section, thickness and quality. The sock; known as a braid, is then placed, along with its mandrel into a female mould tool and resin is injected.

According to another aspect of the invention, there is provided a folding bicycle comprising: a first frame section; a second frame section movably mounted to the first frame section so that the first and second frame sections may be moved relative to each other from an unfolded position to a folded position; a head tube mounted to the first frame section; a front wheel mounted to the head tube; a handlebar tube mounted to the head tube; a rear wheel mounted to the second frame section; wherein, the head tube is movable between the unfolded position in which the head tube extends substantially vertical relative to the first frame section and the folded position in which the head tube extends substantially horizontally and rearwardly relative to the first frame section; and wherein the handlebar tube is movable between the unfolded position in which the handlebar tube extends substantially vertically and upwardly away from the head tube and the folded position in which the handlebar tube extends substantially horizontally and parallel to the head tube.

According to another aspect of the invention there is provided a folding bicycle comprising: a first frame section; a second frame section movably mounted to the first frame section so that the first and second frame sections may be moved relative to each other from an unfolded position to a folded position; and a seat tube; wherein, the seat tube comprises a seat tube sleeve moulded into the frame and a separable post receivable within the sleeve, the sleeve being surrounded by a compressible spring restrained between an upper stop and a lower stop such that a compressive force through the seat post is dampened by the spring, the seat post being connected to a pivot between the first frame section and second frame section by way of a load transfer bracket operable to cause the second frame section to rotate relative to the first frame section in the vertical plane upon application of a compressive force to the seat post when the folding bicycle is in the unfolded condition.

Absorption of impact and vibration loading experienced by a bicycle, in use, contribute to poor quality cycling experience by a rider. A controlled rotation of the second frame portion relative to the first frame portion in the vertical plane in response to an abnormal loading dampens the impact of the abnormal loading as felt by the rider.

In one embodiment, rotation of the second frame portion relative to the first frame portion is provided around a separate motion path to the pivot allowing movement of the rear frame portion relative to the front frame portion when the folding bicycle is moved between the folded condition and the unfolded condition.

In another embodiment, the degree of rotation of the rear frame portion relative to the front frame portion is limited by a physical stop between the front frame portion and the rear frame portion.

According to another aspect of the invention there is provided a folding bicycle comprising a frame; a chain set, front wheel and rear wheel each mounted to the frame; and an electric motor in direct engagement with the chain set to drive the chain set and consequently the rear wheel by way of a chain providing drive means between the chain set and a cassette mounted on the rear wheel.

According to another aspect of the invention there is provided a bicycle comprising: a frame; a chain set, front wheel and rear wheel each mounted to the frame; a hub gear mounted to the frame; and an electric motor, wherein, the electric motor is operably connected to the hub gear by way of a bevelled gear arrangement, and wherein, the hub gear comprises a first sprocket and a second sprocket, the first sprocket connected to the chain set by way of a first driving member and the second sprocket connected to the rear wheel by way of a second driving member such that when the electric motor is engaged, the second sprocket is driven by the electric motor to drive the first sprocket and consequently the rear wheel by way of the second driving member and when the electric motor is disengaged the first sprocket is driven by the chain set to drive the rear wheel and the second sprocket is disengaged.

FIGURES

Embodiments of the present invention will now be described by way of further example only and with reference to the accompanying drawings, in which:

FIG. 3b is a front view of a handlebar tube mounting bracket forming part of the interface of FIG. 3a;

FIG. 3c is a further view of the interface of FIG. 3a;

FIG. 9 shows the internal structure of the front frame portion (12a); and

FIG. 10a shows a first electric motor assistive drive mechanism according to aspects and embodiments of the present invention.

DESCRIPTION

Figure 1:
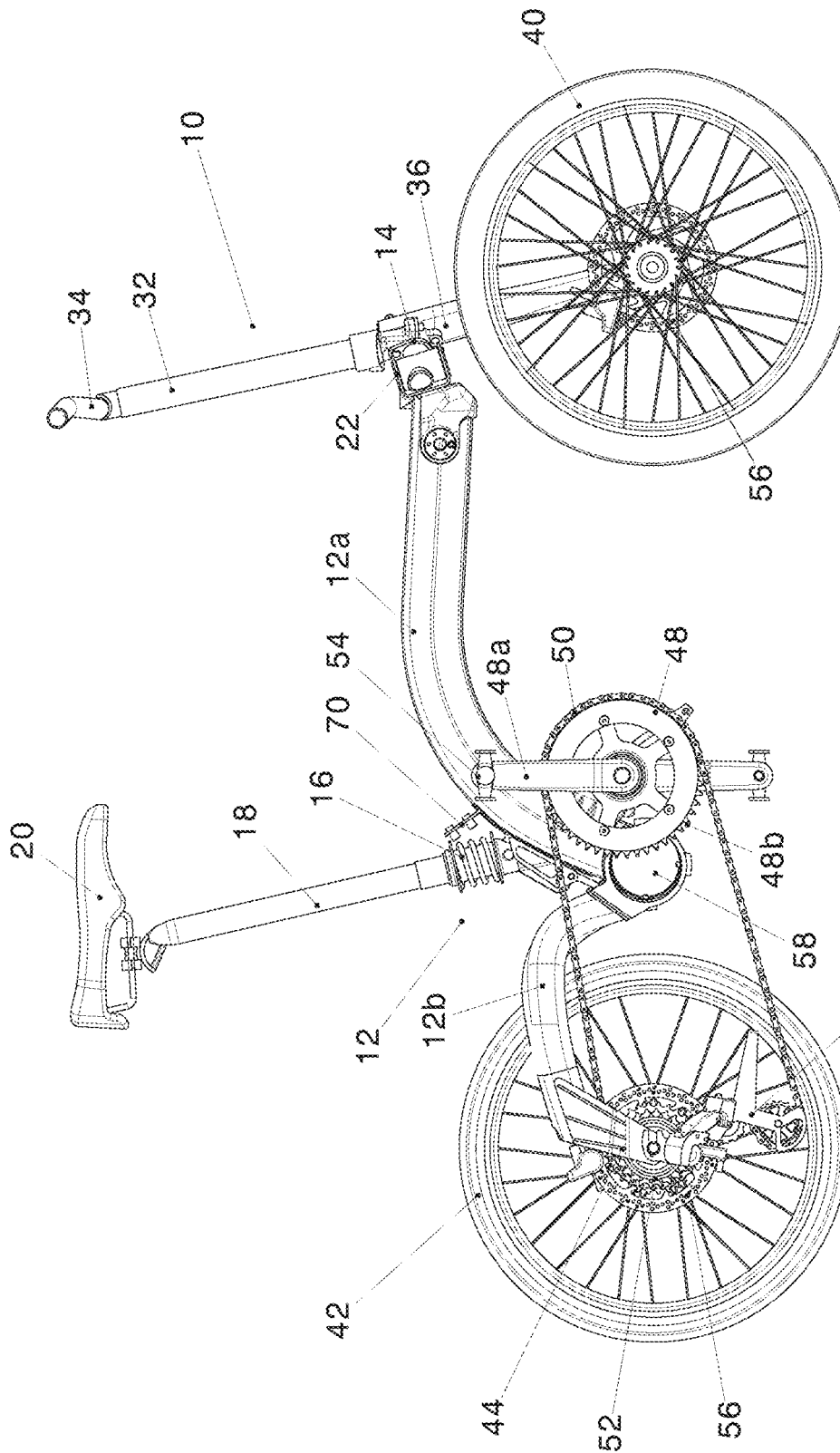
FIG. 1 is side view of a folding bicycle according to an embodiment of the invention in the unfolded configuration.

For ease of reference, standard bicycle component names shall be used throughout and shall have the following meanings:

A "Bottom Bracket" connects the chain set of a bicycle to the bicycle and allows the chain set to rotate freely relative to the bicycle. The bottom bracket comprises a spindle to attach the chain set and an opposing pedal crank and bearings to enable the spindle and cranks to rotate. The term bottom bracket is a throw back to when bracketed tube fittings were used to hold frame tubes together in bicycles manufactured from lugged steel frames. The term is now used in connection with all bicycle frames to describe the component that enables rotation of the chain set and opposing pedal crank. In terms of aspects and embodiments of the invention, the term bottom bracket is used to also describe a novel configuration defining a bridge crank or member that joins the pedal cranks in place of a conventional bottom bracket arrangement.

A "Chain Set", sometimes also called a crank set, comprises one or more chain rings or chain wheels to which the pedal cranks are attached. The chain set is attached to the bicycle by way of the bottom bracket and provides one part of the bicycle drive mechanism. The rider rotates the chain set by pedaling. The chain set is connected to the rear cassette by way of a bicycle chain.

A "Cassette" is a group of stacked gears mounted to the rear wheel of the bicycle and selectable by way of a derailleur. The cassette is connected to the chain set by way of a bicycle chain.

A "Chain" is a set of interlinking pins, plates and rollers connected together to form a loop that extends around the chain set, the cassette and the rear derailleur.

A "Chain Stay" is a pair of frame members that extend from the bottom bracket to the rear fork ends. The folding bicycle of aspects of the present invention does not use chain stays but certain non-folding bicycle configurations using embodiments or aspects of the invention do use chain stays.

A "Derailleur" sits adjacent to each of the cassette and the chain set and uses a system of levers to move the chain on the cassette or the chain set respectively in response to actuation of a gear lever.

A "Down Tube" is a frame member that runs from the head tube to the bottom bracket. The folding bicycle of aspects of the present invention does not use a down tube but certain non-folding bicycle configurations using embodiments or aspects of the invention do use a down tube.

A "Fork" is a frame member that attaches the front wheel and handlebars to a bicycle frame.

A "Fork End" is a slot at the free end of a fork in which a bicycle wheel is mounted.

A "Frame" is the main structural component of a bicycle. For the purposes of this application, the term frame shall be construed as including the top tube, head tube, seat tube, fork and bottom bracket. Where applicable, and is indicated, the term frame shall also be construed as including the seat stays, chain stays and down tube.

A "Head Tube" is typically a tube that includes a bicycle head set. In the context of the present application, the term head tube refers to a front mounted tube that attaches a fork and steering tube.

A "Pedal Crank" is one of two arms that are connected to the bottom bracket on opposite sides of the bicycle frame. Rotation of the pedal cranks results in rotation of the chain set and the rear cassette.

A "Seat Stay" is a pair of frame members, generally of small diameter, running from the top of the seat tube to the rear fork end. The folding bicycle of aspects of the present invention does not use seat stays but certain non-folding bicycle configurations using embodiments or aspects of the invention do use seat stays.

A "Seat Tube" is a frame member that typically runs from the seat to the bottom bracket. The seat tube of aspects of the present invention is moulded into the frame and while it terminates in the region of the bottom bracket it does not extend directly to the bottom bracket.

A "Top Tube" is a generally horizontal tube member, although it may slope, that connects the seat post to the head tube.

Various aspects and embodiments of the invention are described in detail below in conjunction with the attached drawings.

Figure 2:
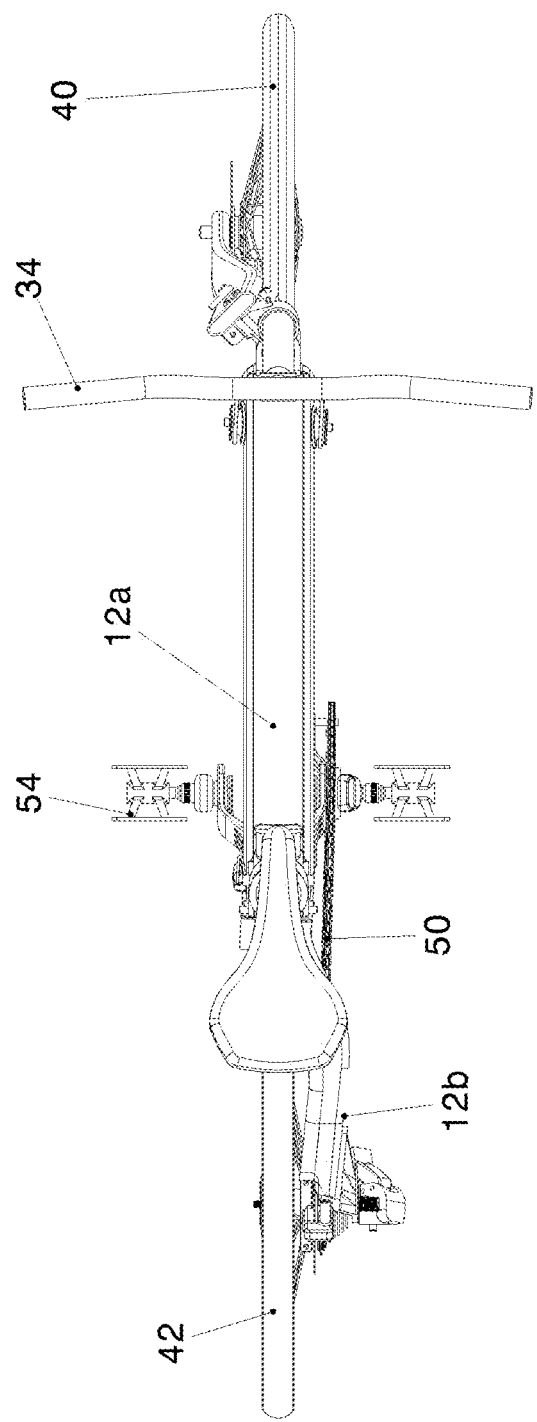
FIG. 2 is a top view of the folding bicycle of FIG. 1.

An embodiment of a folding bicycle (10) is shown in FIGS. 1 and 2 in the unfolded configuration. The bicycle (10) has a frame (12) comprising a front frame portion (12a) and a rear frame portion (12b). The front frame portion (12a) extends generally in the x and y planes. The rear frame portion (12b) extends in the x, y and z planes. The front frame portion (12a) mounts a head tube (14) and a seat tube (16). A seat post (18) is received by the seat tube (16) and a saddle (20) sits atop the seat post (18).

The head tube (14) is mounted to the front frame portion (12a) by way of a bracket (22), as shown in more detail in FIG. 3 and described below, that attaches to either side of the front frame portion (12a) and which is rotatable around a lateral axis relative to the front frame portion (12a) when the bicycle is moved from the unfolded position to the folded position and vice versa.

Figure 3A:
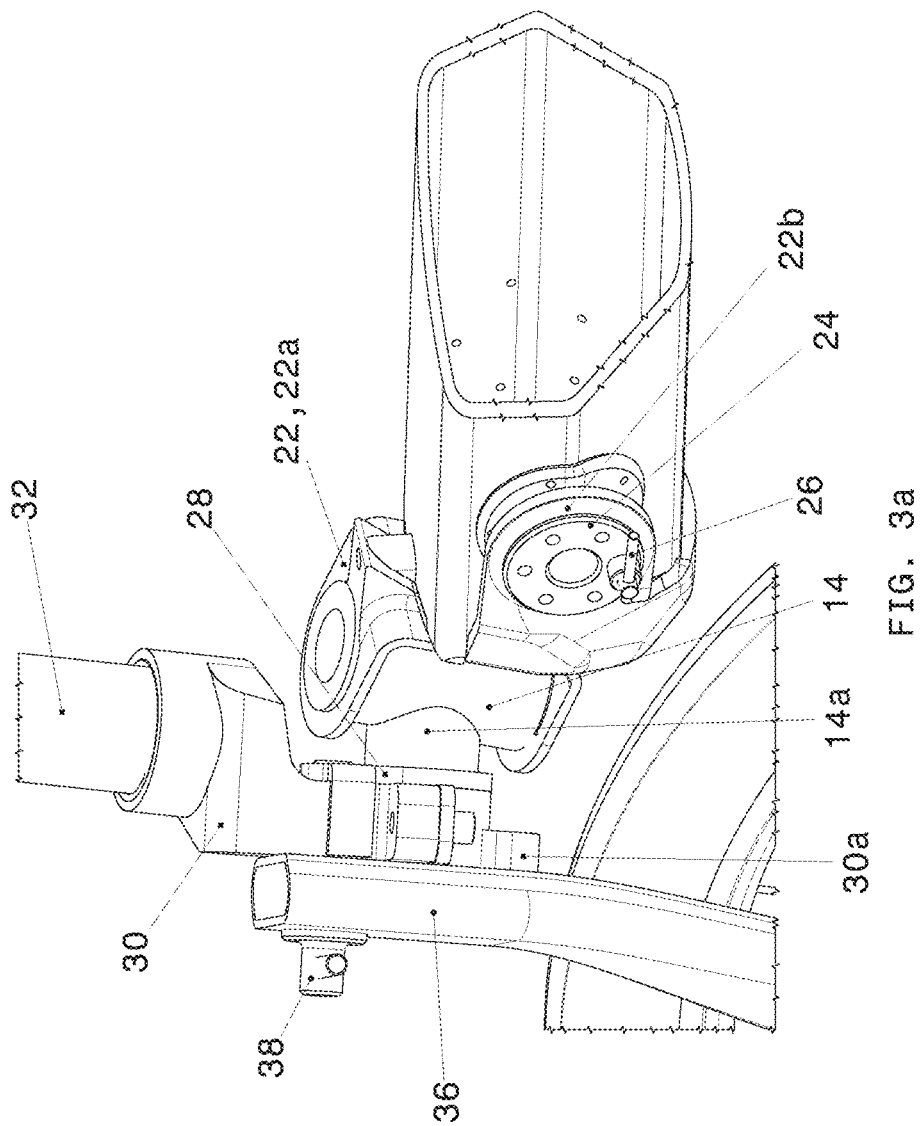
FIG. 3a is an isometric detailed view of an interface between the front frame portion (12a), head tube, fork and handlebar tube.
Figure 3B:
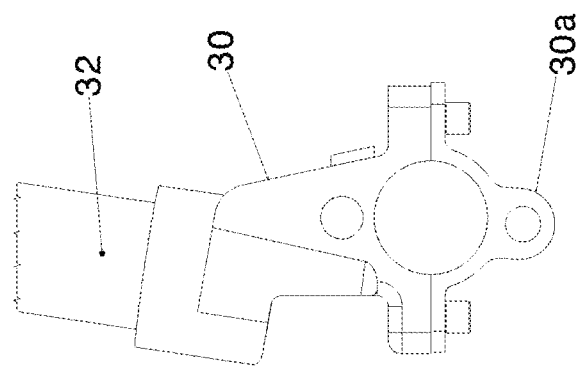
Figure 3C:
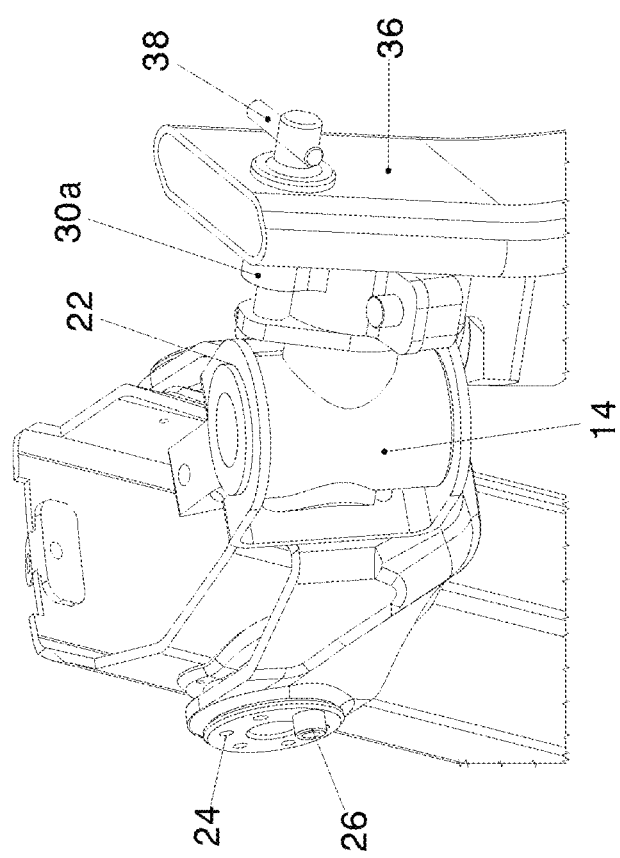

As shown in FIG. 3, the bracket (22) mounting the head tube (14) to the front frame portion (12a) is formed generally from front (22a) and rear (22b) U-shaped configurations. Each of the projecting flanges of the rear facing U-shaped configuration (22b) comprise a cut-out (not shown) through which a fixed projection (not shown) of the front frame portion (12a) is inserted. The bracket (22) is rotatable around the projections. To prevent rotation of the bracket (22) relative to the front frame portion (12a) when the bicycle (10) is in the unfolded position, a lock pin (26) is provided. The lock pin (26) is inserted into a hole through a locking cap (24) that sandwiches the projecting flanges of the bracket (22) between the locking cap (24) and the front frame portion (12a). The hole though the locking cap (24) which receives the lock pin (26) is aligned with a corresponding hole (not shown) in the bracket (22) when the bicycle (10) is in the unfolded position. The lock pin (26) is thus inserted through both the locking cap (24) and the bracket (22) to prevent rotation of the bracket (22) relative to the front frame portion (12a).

Furthermore, when the folding bicycle (10) is in the folded position the handlebars (34) are constrained by way of a retaining pin (30a). The retaining pin (30a), when the folded bicycle (10) is in the folded position engages the mounting plate (28) and the handlebar mounting bracket (30) such that rotation of the handlebars (34) is prevented. The retaining pin (30a) can be removed when moving the folding bicycle from the folded position to the unfolded position to permit rotation of the handlebars (34).

The head tube (14) is able to rotate around its axis relative to the front frame portion (12a). The head tube (14) is rotatably mounted between the projecting flanges of the front facing U-shaped configuration (22a) and held captive therein. The head tube (14) further comprises a forward facing projection (14a) that is fixed to rotate with the head tube (14). A mounting plate (28) is fixed to the forward most end of the forward facing projection (14a). The mounting plate (28) comprises a threaded hole (not shown) for receiving a locking pin or screw (38).

Figure 4:
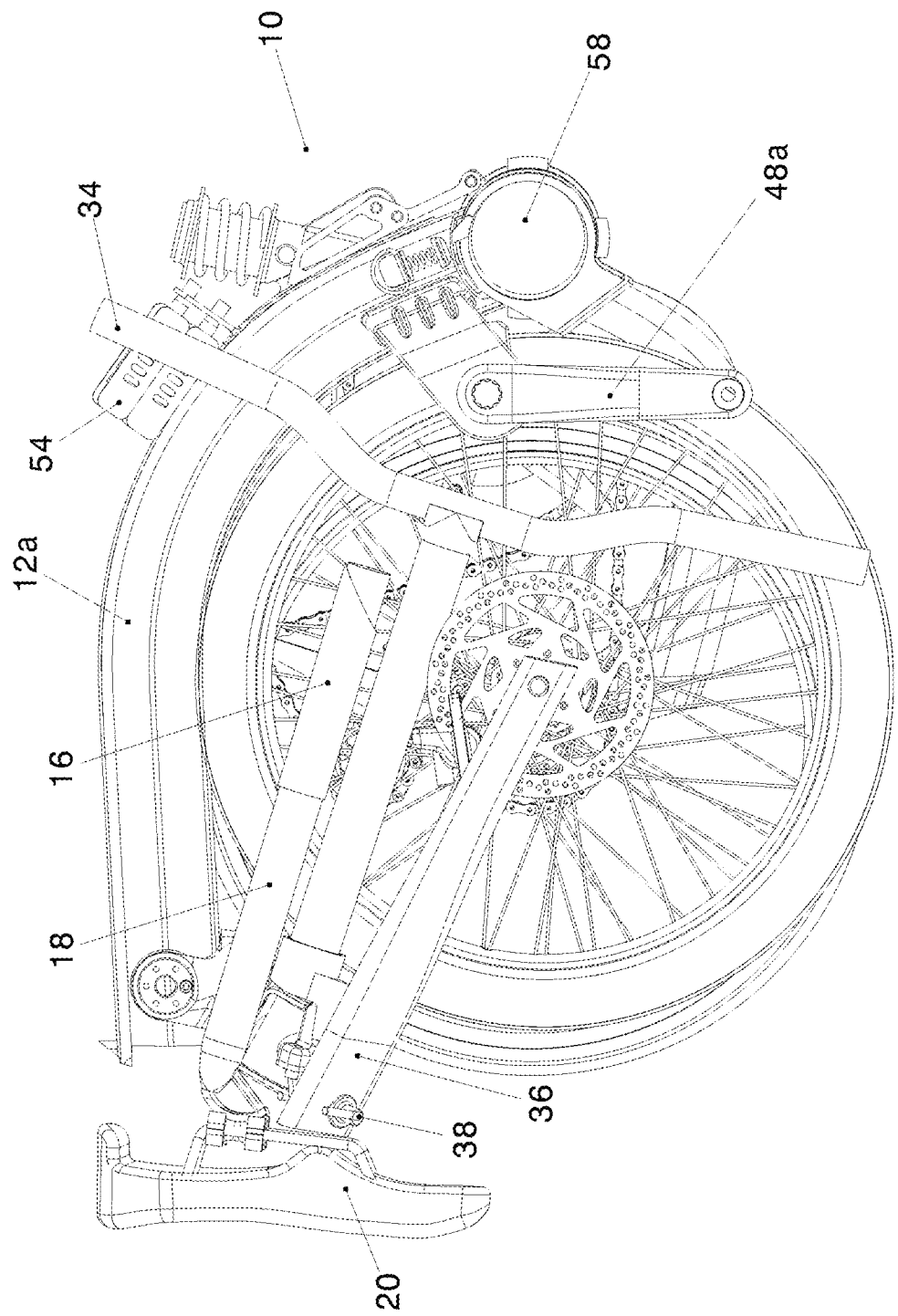
FIG. 4 is an isometric view of a folding bicycle according to an embodiment of the invention in the folded state.

Forward of the mounting plate (28) there is provided a handle bar mounting bracket (30) that locks rotation of the handle bar tube (32) to the rotational plane of the head tube (14). A set of handlebars (34) is mounted atop the handle bar tube (32). The handle bar tube (32) is held captive by the handle bar mounting bracket (30). The handle bar mounting bracket (30) is sandwiched between the single sided fork (36) and the head tube mounting plate (28). When the bicycle (10) is in the folded position (as shown in FIG. 4), the locking screw (38) passes through the single sided fork (36) and the handlebar mounting bracket (30) and engages the threaded hole in the mounting plate (28). Screwing the locking screw (38) into the threaded hole results in application of a compressive force by the locking screw (38) on the forward face of the singled sided fork (36). The locking screw (38) is held captive by the single sided fork (36).

Referring back to FIGS. 1 and 2, the single sided fork (36) mounts the front wheel (40) by way of a slot (not shown) in the free end of the single sided fork (36) that is configured to receive a mounting spindle (not shown) forming part of the front wheel (40). The rear wheel (42) is mounted to the second frame portion (12b) by a hangar (44) including a drop out (not shown) and mounting the rear derailleur (46).

A chain set (48) comprising a pair of crank arms (48a) and at least one chain wheel (48b) is mounted to the front frame portion (12a). A chain (50) extends around the at least one chain wheel (48b) and around the rear derailleur (46) and a rear cassette (52) mounted on the rear wheel (42). A pedal (54) is removably mounted to each crank arm (48a). Each of the front and rear wheels (40,42) is provided with a disc brake (56) but it will be appreciated that conventional caliper brakes, or other braking systems, may also be used.

The folding bicycle (10) is movable from the unfolded position shown in FIGS. 1 and 2 to the folded position shown in FIG. 4. In order to move the folding bicycle (10) from the folded position to the unfolded position, the front and rear frame portions (12a, 12b) are joined by a pivot (58) which allows the rear frame portion (12b) to swing in a forwards motion around a transverse axis relative to the front frame portion (12a) in a manner in which the motion path of the rear frame portion (12b) is offset from the longitudinal axis of the folding bicycle (10) by three degrees. In other embodiments, the motion path of the rear frame portion (12b) may be offset from the longitudinal axis of the folding bicycle (10) by greater than three degrees to accommodate wider tyres.

Figure 5:
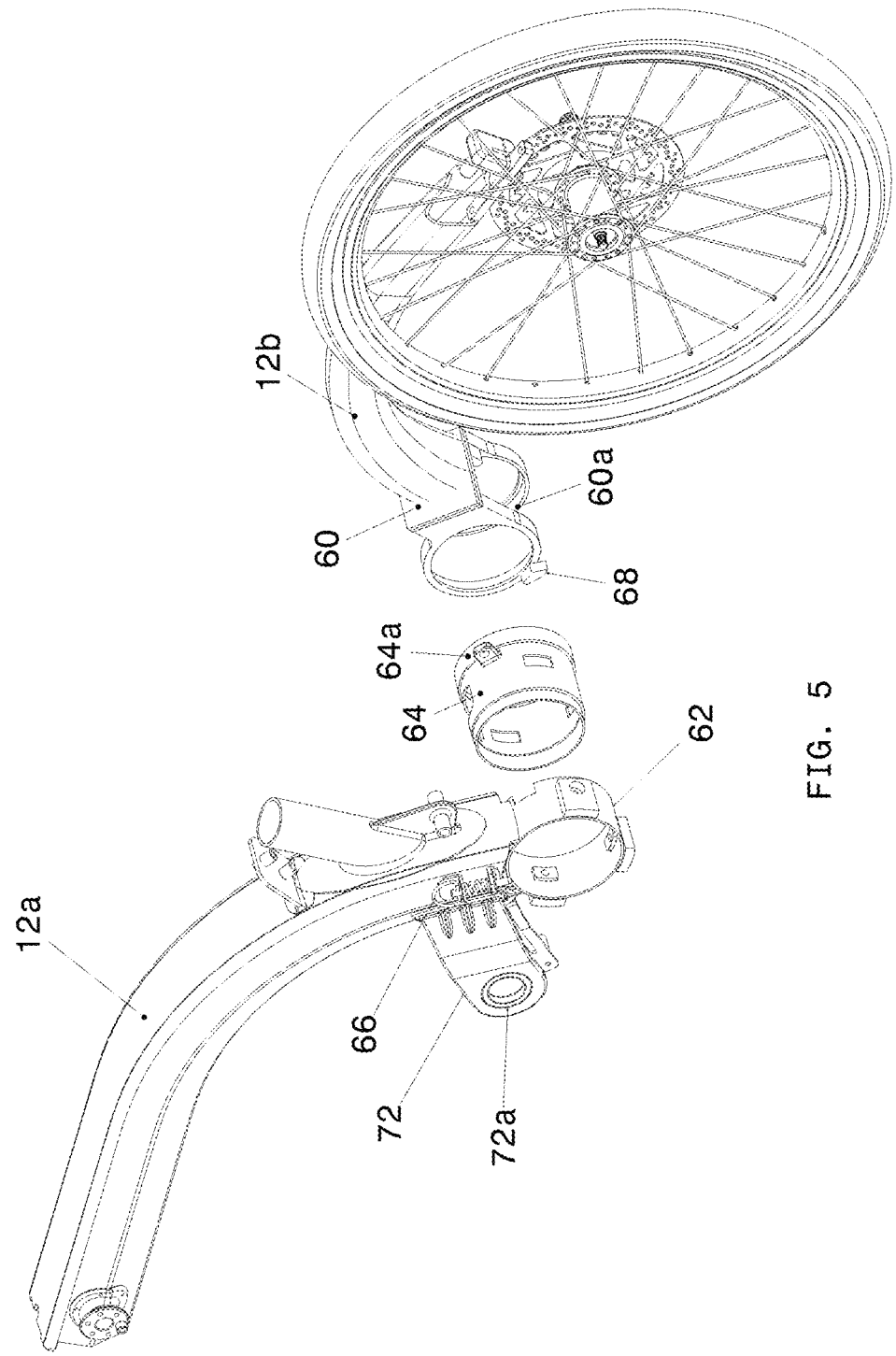
FIG. 5 is a detailed view of a pivot (58) joining the front frame portion (12a) and rear frame portion (12b)

As shown in FIG. 5, the pivot is defined by a double clevis (60) fixedly mounted to the rear frame portion (12b), a mounting cylinder (62) fixedly mounted to the front frame portion (12a), and a rotational interface (64) provided between the double clevis (60) of the rear frame portion (12b) and the mounting cylinder (62) of the front frame portion (12a). The rotational interface (64) is provided by a separate cylinder that is inserted into the mounting cylinder (62) of the front frame portion (12b) and rotatable relative thereto.

The rotational interface (64) is permitted only limited rotation relative to the mounting cylinder (62) of the front frame portion (12a), as will be described below. The double clevis (60) of the rear frame portion (12b) is less constrained and is provided with greater freedom of movement. The inner surface (60a) of the double clevis (60) of the rear frame portion (12b) and the outermost portion of the outer surface (64a) of the rotational interface (64) define a bearing surface therebetween.

When in the folded position, the folding bicycle (10) is locked in the folded position by way of a spring loaded pin (66) attached to the front frame portion (12a) and engaging with a fixed stop (68) attached to the double clevis (60) of the rear frame portion 12(b). The stop (68) is generally arcuate in configuration with two edges angled at approximately forty five degrees from one another and a curved edge. The spring loaded pin (66) engages against an edge of the stop (68) when the folding bicycle (10) is in the folded position. To move the folding bicycle (10) to the unfolded position, the user is required to pull the spring loaded pin (66) so that it moves out of engagement with the stop (68). The rear frame portion (12b) is then able to be rotated relative to the front frame portion (12a) to move the folding bicycle (10) from the folded position to the unfolded position.

Furthermore, the locking pin (38) securing the rotational position of the handlebar tube (32) and handlebars (34) is unscrewed from the mounting plate (28) of the head tube (14) such that the handlebar bracket (30) is then free to rotate relative to the front frame portion (12a) around an axis defined by the forward facing projection (14a) of the head tube (14). This also has the effect of permitting the handlebar tube (32) to rotate relative to the head tube (14) from an unfolded position in which the handlebar tube (32) extends substantially vertically in relation to the frame (12) to a folded position in which the handlebar tube (32) extends substantially horizontally in relation to the frame (12). The handlebar bracket (22) is then rotated downwardly by removing the locking pin (26) that locks the handlebar bracket (22) rotationally to the frame (12). This has the effect of urging the front wheel (40) rearwards and into a parallel spatial configuration with the rear wheel (42), as will be described further below.

The seat post (18) is located within the seat tube (16), in use and locked in place by way of a spring loaded pin engaging with a corresponding hole in the seat tube (16). Several holes may be provided in the seat tube (16) to provide multiple saddle heights. The seat tube (16) is moulded into the front frame portion (12a) and the seat post (18) is removable from the seat tube (16) when moving the folding bicycle (10) from the unfolded position to the folded position. The removed seat post is inserted through a pair of flexible loops (not shown) that are attached to the front frame portion (12a). In such a configuration, the seat post (18) may be used as a handle for transportation of the folding bicycle (10) when the folding bicycle is in the folded position for storage. The pedals are removed and attached to a storage bracket (70) located on the upper surface of the front frame portion (12a).

As shown in FIG. 5, a chain set bracket (72) is moulded into the lowermost part of the front frame portion (12a) and projects away therefrom to provide a mounting interface (72a) for a chain set (48). The chain set bracket (72) comprises a pair of projections with each having a mounting hole for fixing a crank arm (48a) and one or more chain rings (48b) thereto. The mounting holes of each of the pair of projections are aligned to define a crank arm axis.

Figure 6:
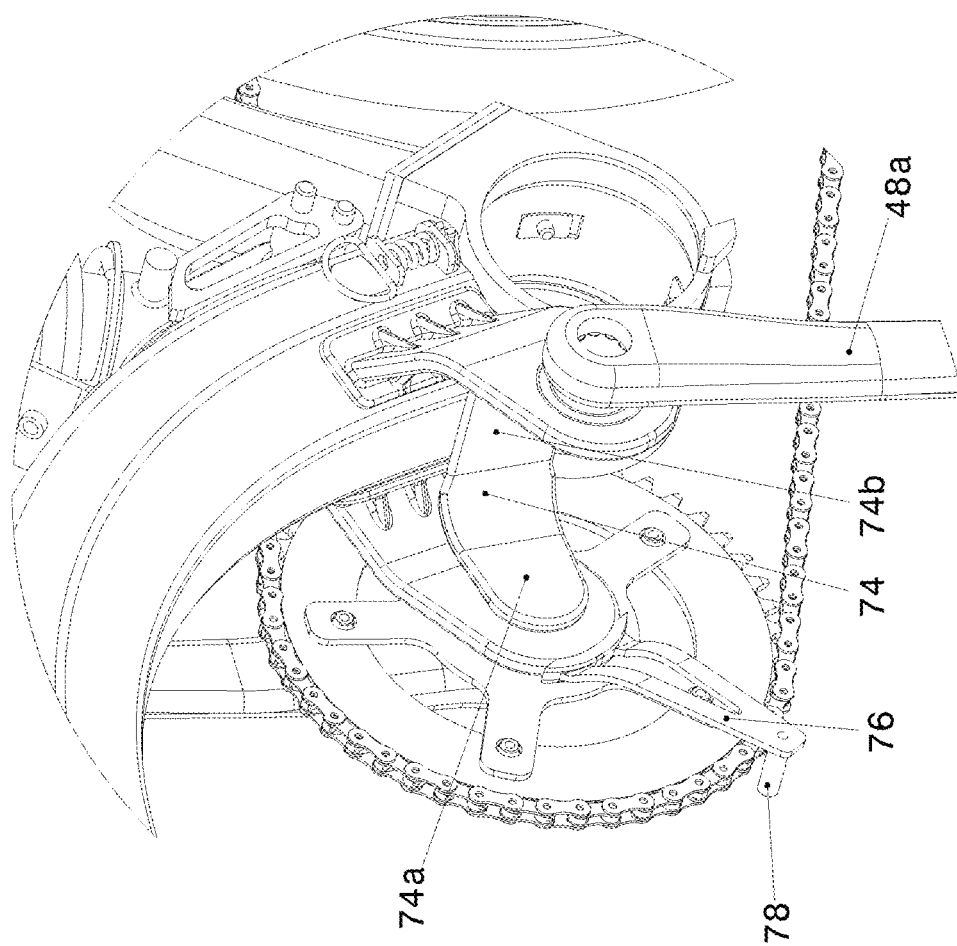
FIG. 6 is a detailed view of a novel bottom bracket design according to aspects of the invention.

Instead of a convention tubular bottom bracket, a bridged or C-shaped bottom bracket (74) is used and is shown in FIG. 6. The bottom bracket (74) comprises a pair of axle members (74a) that extend generally in the same plane as respective crank arms (48a). The pair of axle members (74a) are connected by way of a bridge portion (74b) to permit the bottom bracket (74) to operate in a similar manner to a conventional bottom bracket but defining a void between the pair of axle members (74a). When the folding bicycle is in the folded configuration, the front and rear wheels (40,42) sit within the void defined between the pair of axle members (74a) in a side by side configuration.

The bottom bracket (74) is formed from sheet metal. A blank is prepared from sheet metal stock by way of laser cutting or punching, for example. Pedal crank interfaces are provided at each end of the blank and these are machined prior to joining to the blank through a welding process. Once the pedal crank interfaces are joined to the blank it is folded or bent to define the pair of axle members (74a) and the bridge portion (74b).

As also shown in FIG. 6, the chain set bracket (72) further comprises a hangar (76) that mounts a pin (78). The pin (78) is orientated transverse to the frame (12) and spaced a fixed distance to define a gap of fixed distance between the pin (78) and the chain set (48). When the folding bicycle (10) is moved from the unfolded to the folded position, the chain (50) becomes slack due to the change in distance between the chain set (48) and the rear cassette (52). The pin (78)

reduces the likelihood of the chain (50) slipping off the chain set (48) when the folding bicycle (10) is in the folded position.

Figure 7:
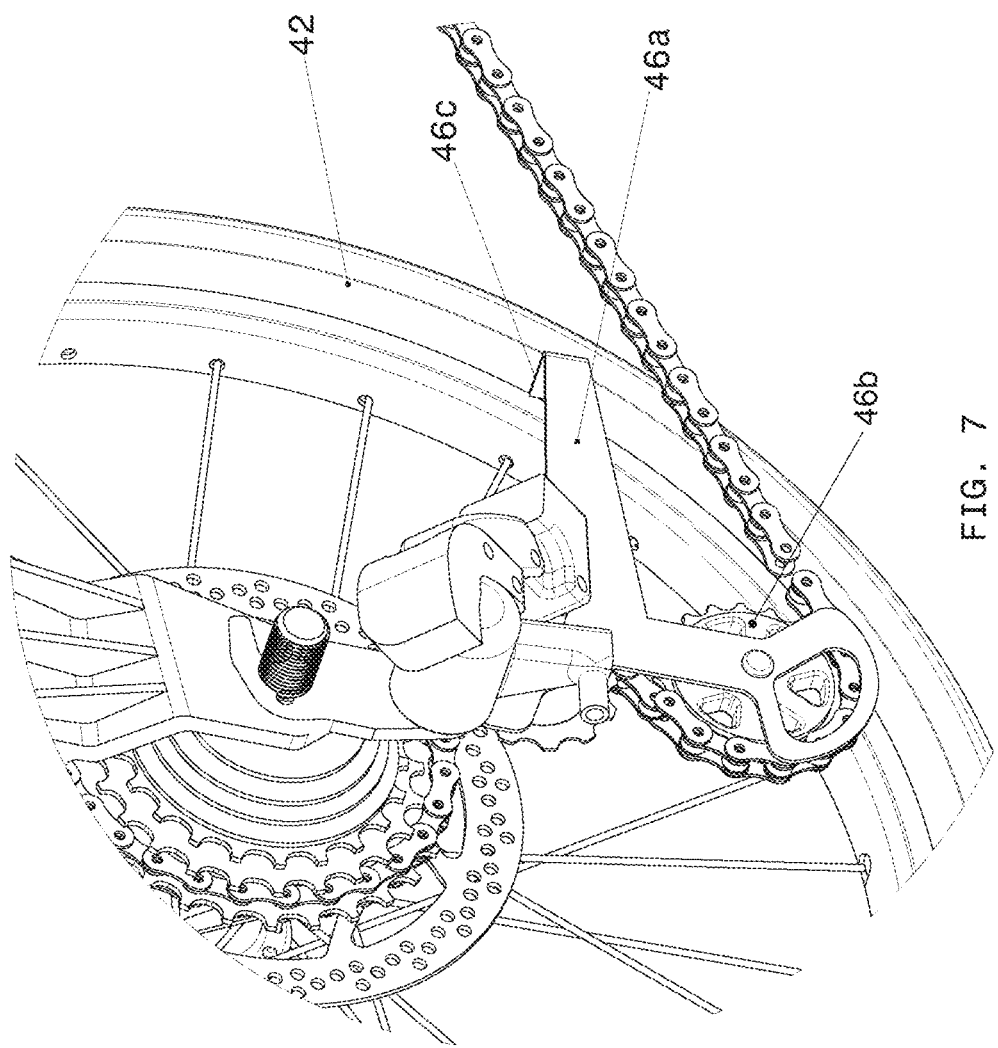
FIG. 7 is a detailed view of a rear wheel and derailleur according to aspects of the invention.
Figure 8A:
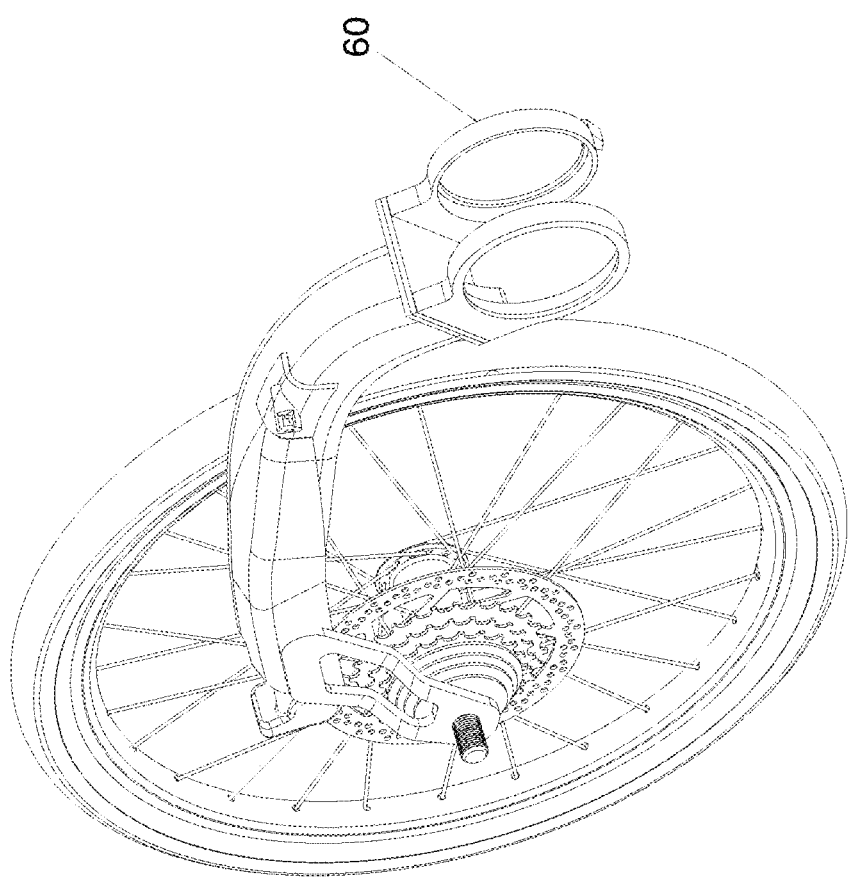
FIG. 8a is a view of the rear frame portion (12b), a double clevis joint (60) and rear wheel assembly.
Figure 8B:
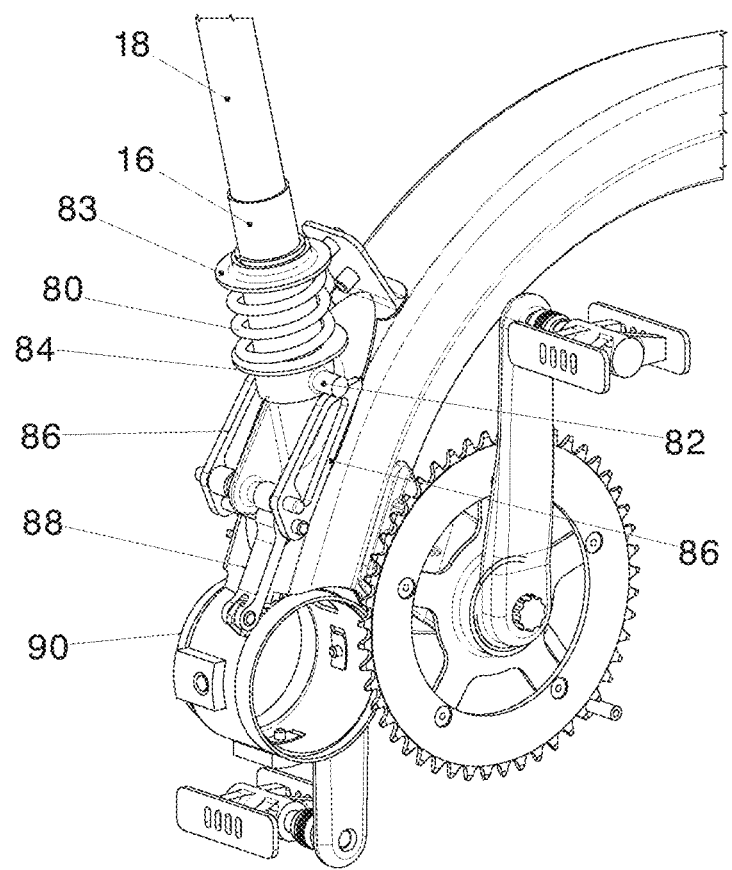
FIG. 8b is a detailed view of a suspension system according to aspects of the invention.
Figure 8C:
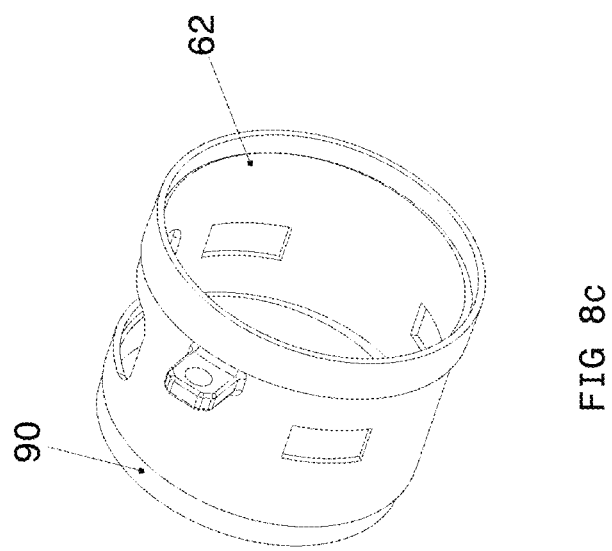
FIG. 8c is a view of a mounting cylinder (62) forming part of the pivot (58)
Figure 8D:
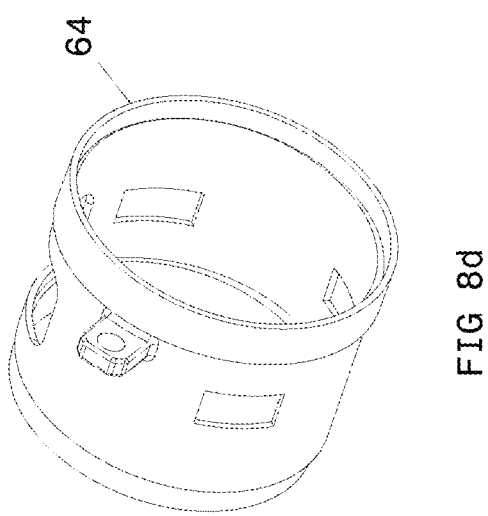
FIG. 8d is a view of a rotational interface between the mounting cylinder (62) and the double clevis (60) of the rear frame portion (12b)

To further maintain tension in the chain, a projection (46a) is provided from the rear derailleur (46) as shown in FIG. 7. The rear derailleur (46) comprises a standard jockey wheel (46b) around which the chain (50) extends and also a projection (46a) thus defining a T-shape derailleur plate. The projection (46a) extends substantially in the direction of the longitudinal axis of the folding bicycle (10) and has a ninety degree return flange (46c) for picking up the chain (50) when the folding bicycle (10) is moved from the unfolded to the folded position. The return flange (46c) of the projection (46a), when the folding bicycle (10) is moved from the unfolded positon to the folded position, automatically latches to the chain (50) and provides a constant tension between the pin (48) of the bracket and the projection (46a) of the rear derailleur (46). When the folding bike (10) is moved from the folded position to the unfolded position, the chain (50) unlatches from the return flange (46c) of the projection (46a) without user intervention and tension is again provided between the chain set (48) and the rear cassette (52).

As shown in FIG. 8, the seat post tube (16) comprises a spring (80) constrained between an upper (83) and lower stop (84). When the seat post (18) is inserted into the seat post tube (16), a constant load path is defined between the seat post (18) and the seat post tube (16). To provide a more comfortable ride a load experienced when riding over a pothole, for example, is transferred to the pivot (58) between the front frame portion (12a) and rear frame portion (12b). As the spring (80) is compressed it comes into contact with the lower stop (84) urging it downwards and into contact with a pair of projections (82) extending outwardly from the seat post tube (16). Each projection (82) is in contact with a respective damping bracket (86). Each damping bracket (86) is connected to a common load transfer bracket (88) which in turn is connected to a pivot (90) between the front frame section (12a) and rear frame section (12b). The pivot (90) is defined by a welded metallic insert that is secondarily bonded into the first frame portion (12a) and second frame portion (12b) or co-cured therewith, for example. This arrangement provides a load transfer path between the seat post (18) and the pivot (58) between the front frame portion (12a) and rear frame portion (12b). Upon application of a load, the arrangement causes rotation of the front frame portion (12a) in the vertical plane only relative to the second frame portion (12b) to reduce the impact felt by a rider.

Rotation of the mounting cylinder (62) is constrained by projections from the inner surface of the rotational interface (64) protruding through slots through the mounting cylinder. Consequently, upon application of a compressive force to the spring (80), the load is transferred through the spring (80) and the damping brackets (86) into the common load transfer bracket (88) and the mounting cylinder (62). The mounting cylinder (62) rotates to dampen impact forces that would otherwise be transmitted from the wheels (40,42) to the seat post (18).

As shown in FIG. 9, the front frame portion (12a) is thin walled and has a wall thickness of nominally around 3 mm—but could be vary from 2 mm to 5 mm as a monolithic element or as much as 12 mm if a sandwich core approach is used, comprising of 2 carbon skins, each of 2 mm or so thickness and a foam core of 8 mm for example—and defines a channel therein. In embodiments of the invention that comprise an electric motor, batteries (94) for powering an electric motor (96) are housed within the front frame portion (12a). A plurality of separate battery cells (94) are inserted into the front frame portion and can be removed for charging or charged in-situ, in each case using an external battery charger. The battery cells form a battery pack and are linked physically and electrically and be removed for charging or replacement to eliminate downtime. The battery pack comprises five cell units that each contain eight battery cells making a total battery pack size of forty cells. The physical link between each cell unit is provided by a pin joint with clevis to provide a degree of freedom around the Y-axis. The battery pick is rigidly mounted within the first frame portion (12a) on anti-vibration fixings.

As shown in FIG. 10a, in a powered folding bicycle (10) according to an embodiment of the invention, the electric motor (96) and an associated gear box (98) are mounted to the frame (12) adjacent to the chain set (48). A sprocket (100) provides direct engagement between the electric motor/gearbox (96, 98) and a chain ring (48b) of the chain set (48). Engagement is provided by a plurality of projecting pins (102) that each engage with a respective space between teeth of the chain ring (48b). The pins (102) are positioned around a motor axis. As the electric motor (96) rotates, the sprocket (100) rotates thus driving the chain ring (48b) in the direction of rotation of the electric motor (96). As the sprocket (100) rotates, only a single pin (102) is in engagement with the chain ring (48b) at any one time. When the chain ring (48b) rotates, the next pin (102) engages the next space between teeth of the chain ring (48b). In other embodiments more than one pin (102) is in engagement with respective spaces between teeth of the chain ring (48b).

The electric motor (96) is only engaged when a predetermined torque is determined through the pedals (54). The electric motor (96) is intended to provide assistive power rather than being a primary drive source for the folding bicycle (10). When the user stops pedalling, the electric motor (96) is disengaged. Torque is determined by a torque sensor (not shown) associated with the electric motor (96). A processor monitors the torque measured by the torque sensor. When the measured torque reaches a predetermined threshold, and assistive power is selected by the user, the electric motor is engaged (96). When the torque measured by the torque sensor drops below the pre-determined threshold the electric motor (96) is disengaged. The amount of assistance provided by the electric motor (96) depends on the torque measured by the torque sensor and the degree of assistance selected by the user.

For example, the user may elect to turn off assisted drive and the electric motor (96) will not be engaged at all. The user may also elect to benefit from maximum assisted drive such that when the user pedals at any time on their journey, the electric motor (96) will provide assistance. It is intended that the user will still be required to pedal to maintain assisted drive. The amount of assistance provided may also vary during a journey. Where the user elects to receive a degree of assisted drive between zero and full, assisted drive may not be provided when the user cycling at a moderate speed along a flat road. However, if the user then starts cycling up a hill, the required wattage to maintain momentum increases. The processor can determine the torque input by the user and compensate by instructing the electric motor (96) to provide sufficient assisted drive to maintain a moderate speed. Conversely, when the user starts to ride down a hill, the processor recognises that the torque input by the user has dropped and instructs the electric motor (96) to disengage.

The chain set (48) is mounted to the bicycle frame (12) by way of a sprag bearing, or sprag clutch. Such an arrangement enables torque to be transmitted through the pedals (54) when the user pedals in a clockwise motion. If the user pedals in an anti-clockwise motion or if the pedals (54) rotate and hit the back of the user's legs when the electric motor (96) is engaged, the sprag bearing, or clutch, allows the chain set (48) to rotate anti-clockwise freely under no load. In other embodiments, a fully electric folding bicycle may receive primary power from the electric motor (96).

The driveline configuration described above in relation to FIG. 10a is given by way of example only. In other embodiments, motive power may be provided by the rider through the pedals only or solely through an electric motor with no rider input. Alternatively, a hub gear arrangement may be provided with an associated longitudinal electric motor associated therewith. Such a hub gear arrangement may drive a chain or a drive belt. Different configurations of driveline configuration may be chosen based on application or rider requirements.

Figure 10B:
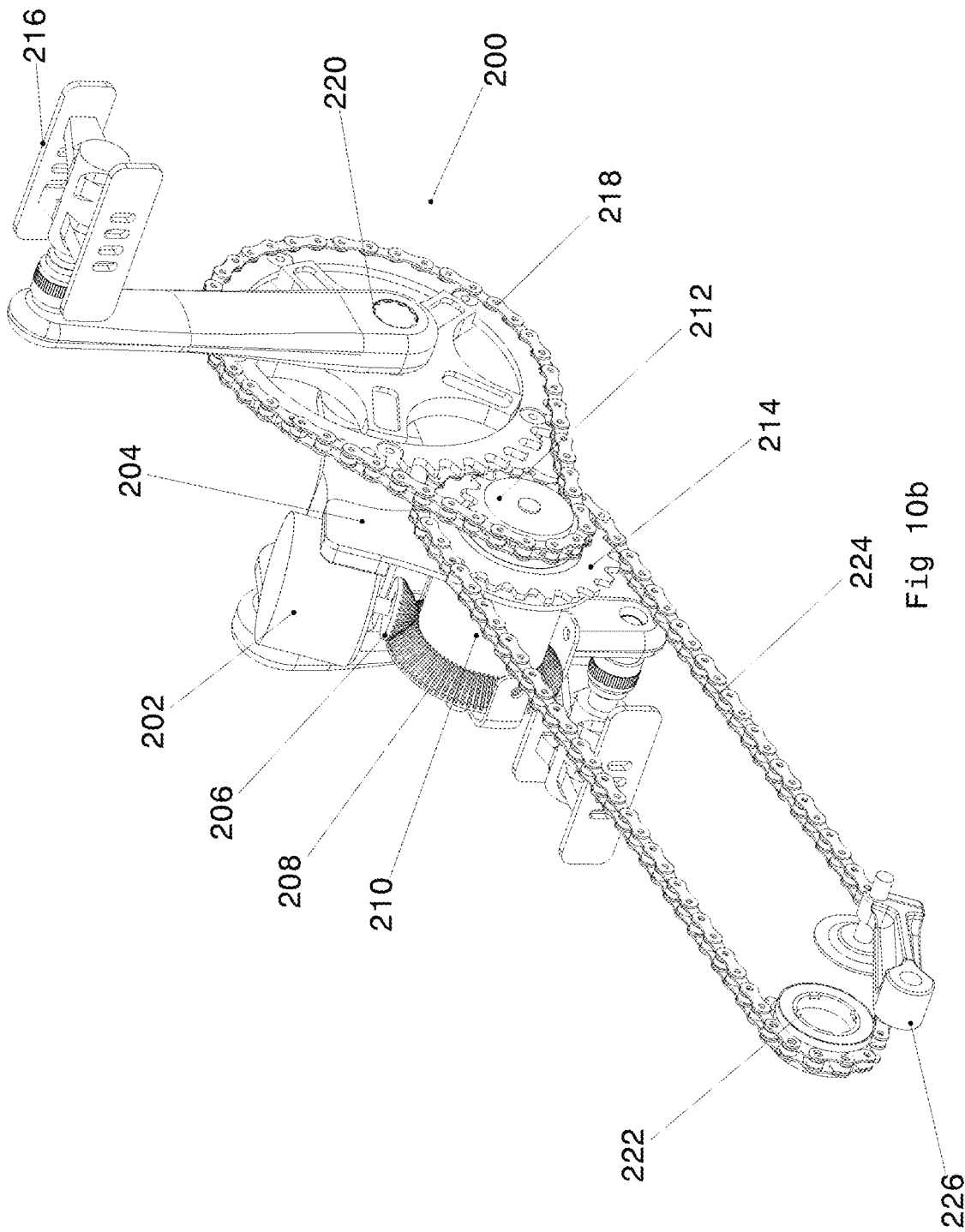
FIG. 10b shows a second electric motor assistive drive mechanism according to aspects and embodiments of the invention.

FIG. 10b illustrates a hub gear driveline arrangement (200). An electric motor (202) is mounted to a support bracket (204) and angled in a generally vertical orientation. The electric motor (202) comprises a bevelled gear (206) that, in use, is in driving engagement with a bevelled gear (208) of a hub gear arrangement (210). The hub gear arrangement (210) further comprises two conventional sprockets (212, 214). The first conventional sprocket (212) and the second conventional sprocket (214) are disconnected under certain drive configurations such that one can be driven in isolation of the other. The first conventional sprocket (212) is driven by the rider turning the pedals (216) in a clockwise rotation and is driven by a chain (218) or drive belt between the first conventional sprocket (212) and the chainset (220). As the pedals (216) are turned, the first conventional sprocket (212) is driven in a clockwise rotation. This has the effect of also driving the second conventional sprocket (214). The second conventional sprocket (214) is connected to a freewheel cog (222) located on the hub of the rear wheel by way of a second chain or driveshaft (224). Thus, when the rider turns the pedals, the freewheel cog is rotated to drive the rear wheel of the folding bicycle.

When the electric motor (202) is engaged, the first conventional sprocket (212) is disengaged. The electric motor (202) drives the second conventional sprocket (214) which in turn drives the freewheel cog (222) to drive the rear wheel of the folding bicycle. Chain, or drive belt, tension is maintained by a sprung tensioning arm (226) located adjacent to the freewheel cog (222) in place of a standard derailleur.

The procedure for moving the folding bicycle (10) from the unfolded position to the folded position comprises: i) positioning the bridged bottom bracket so that the void therein is orientated rearwardly; ii) disengaging the locking pin and folding the rear frame portion forward so that the rear wheel sits within the void defined by the bridged bottom bracket; iii) untightening the lock screw to disengage the handle bars from the from head tube mounting plate; iv) rotating the handlebars from the ride position to the stowed position; v) removed the pedals and seat post from their ride position and inserting into a pedal stowage bracket and seat post stowage position respectively.

The procedure for moving the folding bicycle (10) from the folded position to the unfolded position comprises: i) removing the pedals and seat post from their stowed position and inserting into the pedal arms and seat post sleeve respectively, ii) rotating the handlebars from the stowed position to the ride position, iii) unfolding the front frame portion (12a) and tightening the lock screw so that it engages with the head tube mounting plate, and iv) disengaging the locking pin and unfolding the rear frame portion.

The foregoing description has been given by way of example only and it will be appreciated by a skilled person that modifications can be made without departing from the scope of the present invention.

The invention claimed is:

1. A folding bicycle comprising:
   a first frame section;
   a second frame section movably mounted to the first frame section so that the first and second frame sections may be moved relative to each other from an unfolded position to a folded position;
   a front wheel mounted to the first frame section;
   a rear wheel mounted to the second frame section;
   a chain set mounted to the first frame section comprising a bottom bracket and defining an axis of rotation;
   wherein, the bottom bracket comprises first and second axle members extending orthogonally to the axis of rotation and a bridge portion connecting the first and second axle members, the bottom bracket defining a void between the first and second axle members; and
   wherein, when in a folded position the front and rear wheels are positioned at least partially within the void defined between the first and second axle members.

2. The folding bicycle according to claim 1, wherein the bottom bracket extends from the first frame section and defines respective mounting locations for each of the first and second axle members.

3. The folding bicycle according to claim 2, wherein the first frame section is formed from a carbon material and the bottom bracket is an integral moulded feature of the first frame section and further comprises one or more stiffening ribs between the bottom bracket and the first frame section and/or the bottom bracket is formed from metal plate and secondarily bonded to the first frame section.

4. The folding bicycle according to claim 2, wherein the bottom bracket is formed from a carbon or metal material.

5. The folding bicycle according to claim 2, wherein the bottom bracket further comprises a chain retainer fixedly mounted and extending from the bottom bracket and defining a gap between the chain set and the chain retainer to maintain engagement between the chain and a chain set when the folding bicycle is in the folded configuration.

6. The folding bicycle according to claim 5, wherein the gap defined between the chain retainer and the chain set is in the range of 5-20 mm.

7. The folding bicycle according to claim 2, wherein each crank arm is configured to receive a selectively removable pedal by way of a push fit fixing.

8. The folding bicycle according to claim 1, wherein the bridge portion of the bottom bracket is offset from the axis of rotation by a distance of 30-80 mm.

9. A folding bicycle comprising:
   a first frame section;
   a second frame section movably mounted to the first frame section so that the first and second frame sections may be moved relative to each other from an unfolded position to a folded position;
   a front wheel mounted to the first frame section;
   a rear wheel mounted to the second frame section;
   a chainset mounted to the first frame section and comprising one or more chain rings;
   a rear hub mounted to the second frame portion;
   a chain extending around and between the one or more chain rings and the rear hub;

a chain retainer fixedly mounted to the first frame portion and defining a gap between the chainset and the chain retainer to maintain engagement between the chain and the chainset when the folding bicycle is in the folded configuration;

wherein the first frame section is formed from a carbon material and a bracket is an integral moulded feature of the first frame section and further comprises one or more stiffening ribs between the bracket and the first frame section.

10. A folding bicycle comprising:

a first frame section;

a second frame section movably mounted to the first frame section so that the first and second frame sections may be moved relative to each other from an unfolded position to a folded position;

a front wheel mounted to the first frame section;

a rear wheel mounted to the second frame section;

a chainset mounted to the first frame section and comprising one or more chain rings;

a rear hub mounted to the second frame portion;

a chain extending around and between the one or more chain rings and the rear hub;

a chain retainer fixedly mounted to the first frame portion and defining a gap between the chainset and the chain retainer to maintain engagement between the chain and the chainset when the folding bicycle is in the folded configuration;

a rear derailleur comprises a T-shape portion;

wherein the rear derailleur is configured to receive a portion of the chain and provide tension to the chain when the folding bicycle is moved from the unfolded position to the folded position; and wherein the T-shaped portion of the rear derailleur further comprises an orthogonal projection for engagement with the chain.

* * * * *